United States Patent [19]

Akino et al.

[11] 4,311,286
[45] Jan. 19, 1982

[54] FIXED REEL TYPE ENDLESS TAPE CASSETTE

[75] Inventors: Morio Akino, Fujisawa; Seiichi Yanagida, Hiratsuka; Hiroshi Yamashita, Yokohama, all of Japan

[73] Assignee: Tokyo Shibaura Denki Kabushiki Kaisha, Kawasaki, Japan

[21] Appl. No.: 104,455

[22] Filed: Dec. 17, 1979

[30] Foreign Application Priority Data

Jan. 18, 1978 [JP] Japan .................................. 53-3800

[51] Int. Cl.³ ...................... B65H 17/48; G11B 23/10
[52] U.S. Cl. ............................ 242/55.19 A; 217/62;
220/350; 242/198; 360/93
[58] Field of Search ............... 242/55.19 A, 55.19 R,
242/198; 360/93, 132; 352/128, 72, 78;
280/350; 217/62

[56] References Cited

U.S. PATENT DOCUMENTS

| | | | |
|---|---|---|---|
| 3,287,508 | 11/1966 | Morrison | 242/55.19 A |
| 3,726,457 | 4/1973 | Staar | 360/93 |
| 3,861,611 | 1/1975 | Esashi et al. | 242/55.19 A |
| 3,932,891 | 1/1976 | Horvath | 242/55.19 A |
| 3,957,219 | 5/1976 | Tsukamoto et al. | 242/55.19 A |

FOREIGN PATENT DOCUMENTS

| | | |
|---|---|---|
| 2800313 | 7/1979 | Fed. Rep. of Germany ... 242/55.19 A |
| 2001931 | 2/1979 | United Kingdom ........ 242/55.19 A |

*Primary Examiner*—Billy S. Taylor
*Attorney, Agent, or Firm*—Oblon, Fisher, Spivak, McClelland & Maier

[57] ABSTRACT

An endless tape cassette including a stationary reel having a slit communicating the inner and outer peripheral sides and carrying an endless tape wound on the outer periphery, guide plates for guiding the endless tape wound on the stationary reel such that it is pulled out from the inner periphery of the tape roll through the slit and taken up on the outer periphery of the tape reel, and a housing accommodating and supporting the stationary reel and guide plates. The housing includes a bottom plate formed with an opening for permitting a tape drive mechanism to be inserted therethrough into housing for operative coupling to said endless tape, a top plate facing said bottom plate, a pair of side plates, a front end plate and a rear end plate. A flexible lid member is provided on the housing to be movable between a first position at which it extends along the bottom plate for closing the opening in the bottom plate and a second position at which it extends along the top plate for opening the opening in the bottom plate.

11 Claims, 10 Drawing Figures

F I G. 7A
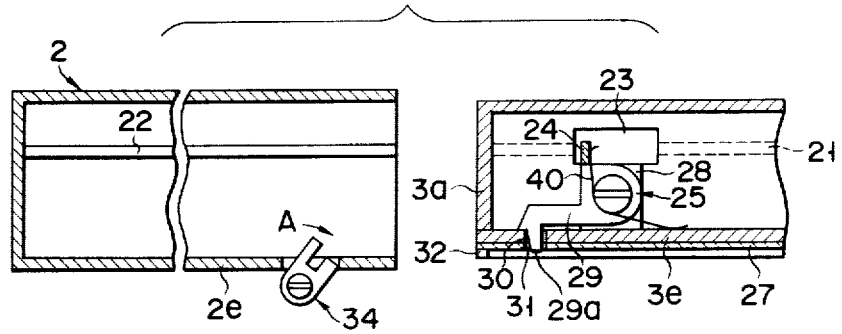
F I G. 7B
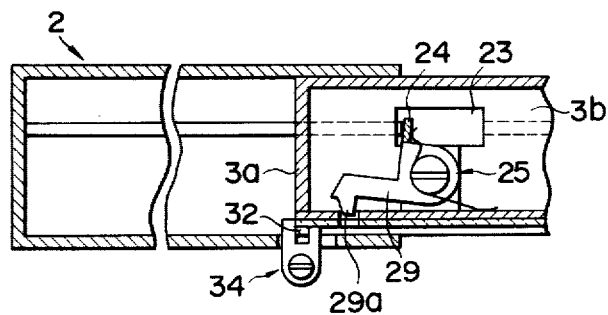
F I G. 7C
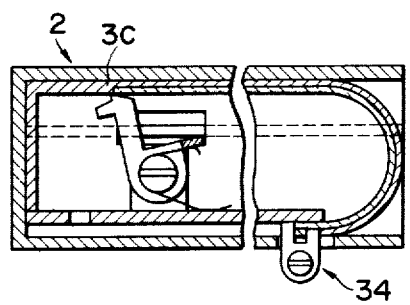

FIXED REEL TYPE ENDLESS TAPE CASSETTE

BACKGROUND OF THE INVENTION

1. Field of the Invention

This invention relates to endless tape cassettes having a housing in which is received a tape wound on a stationary reel.

2. Description of the Prior Art

With a usual tape recorder for recording and reproducing video signals (hereinafter referred to as VTR) the required relative speed between tape and head is obtained by using a rotatable head. Recently, however, a so-called stationary head VTR has been proposed, in which an endless tape runs at as high a speed as several meters or more per second for recording and reproduction with a magnetic head fixed in position in the direction of the length of the tape (but capable of being shifted in the direction of the width of the tape).

This stationary head VTR has, on one hand, a merit that the head mechanism is simplified, but on the other hand a demerit that the handling of the tape tends to be intricate. This is due to the adoption of a system, in which an endless tape wound on the reel is led out from the inner-most peripheral side of the tape roll and is taken up from the outer-most peripheral side through a tape drive mechanism including the head, a capstan and a pinch roller. In this system, a tape replacement is made either by removing the tape from the reel and providing a new tape on the reel, or by replacing the taped reel with another. In either case, the operation of replacing the tape is very troublesome, and also at the time of the replacement it is likely that the tape is touched by hand or detached from the reel and thus stained or damaged. Further, at the time of tape transportation or storage much care is also required to be taken as in the case of the tape being in an exposed state.

Under these circumstances, it is desirable that the tape in the stationary head type VTR be made available in the form of a cassette tape. To meet this demand, an endless tape receiving structure or cassette has been contemplated which is adapted to receive the endless tape in a tape receiving case or housing together with the reel and, at the time of installing this case inside the body of a tape travel device, to open a lid of the case and lead out part of the tape roll on the reel outwardly of the same, and to set the tape portion thus led out to a tape travel mechanism. In this system, however, an additional mechanism for leading out the tape from the reel (a mechanism for leading out the tape to the outside of a casing receiving the tape in an interlocked relation to the operation of drawing out a lid provided on the case) is required in particular, so that the tape receiving structure itself as a cassette is inevitably complicated and expensive. Further, the tape drive system is also complicated in construction since it requires an additional mechanism for controlling the afore-mentioned mechanism for leading out the tape. Furthermore, with this cassette the lid outwardly projects when it is pulled out, and therefore an extra space has to be provided in the tape drive system, thus imposing considerable restrictions upon the design of the tape drive system.

SUMMARY OF THE INVENTION

An object of the invention, accordingly, is to provide an endless tape cassette, which is best suited particularly to the stationary head VTR and also which is simple in construction and capable of being readily handled, can reliably protect the accommodated tape and does not dictate any extra space in the tape drive system even during its use.

As the endless tape drive system for the stationary head VTR, a rotary reel type and a stationary reel type are known in the art. In this stationary reel type, a ring-like body having a communicating section communicating its inner and outer peripheral sides is used as the reel in a stationary state, and an endless tape which is wound as a roll on the outer periphery of the reel is let out from the inner periphery through the aforementioned communicating section and taken up on the other periphery of the tape roll.

The inventors have improved the endless tape drive system of this stationary reel system and achieved further size reduction of the system by making use of the space on the inner side of the ring-like body of the stationary reel for disposing the tape drive system there.

This invention provides an endless tape accommodating device, that is, tape cassette, which is suited to the endless tape drive system of the above construction. When the tape drive mechanism is disposed in the space within the inner periphery of the stationary reel, the tape need not be led out to the outside of the reel when it is driven. Thus there is no need of providing the tape accommodating device with a mechanism for leading out the tape to the outside. It is only necessary to provide the bottom of the case accommodating the tape with an opening for inserting therethrough a tape drive mechanism, (which is on the side of the endless tape drive system and in which the tape led out from the inner periphery of the tape roll through the communicating section is set,) and a lid for opening and closing the opening. However, if the lid is rigid, its handling is troublesome, and when it is pulled out for opening the cassette case, it is likely to be obstructive to other parts in operation.

The endless tape cassette according to the invention solves the above problem. One aspect of the invention is an endless tape cassette to be loaded for driving an endless tape accommodated therein on a tape drive system having a tape drive mechanism and a tape support mechanism for supporting the endless tape cassette such that the tape is driven by the tape drive mechanism, including a stationary reel having a communicating path communicating the inner and outer peripheral sides and carrying the endless tape wound on the outer periphery, a guide member for guiding the endless tape wound on said stationary reel such that it is pulled out from the inner periphery of the tape roll through the communicating path and taken up on the outer periphery of the tape reel, a housing accommodating and supporting the stationary reel and guide member, the housing including a bottom plate formed with an opening for permitting the tape drive mechanism to be inserted therethrough into housing for operative coupling to the endless tape, a top plate facing the bottom plate, a pair of side plates, a front end plate and a rear end plate, and a lid member having a flexible plate provided on the housing to be movable between a first position at which it extends along the bottom plate for closing said opening in the bottom plate and a second position at which it extends along the top plate for opening the opening in said bottom plate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIGS. 7A, 7B and 7C are sectional views illustrating the loading of the tape cassette in a bucket, with FIG. 7A showing a state before loading, FIG. 7B showing a state during loading and FIG. 7C showing a state at the time of completion of loading.

DETAILED DESCRIPTION OF THE PREFERRED EMBODIMENTS

An endless tape cassette embodying the invention will now be described with reference to the accompanying drawings.

Figure 1:
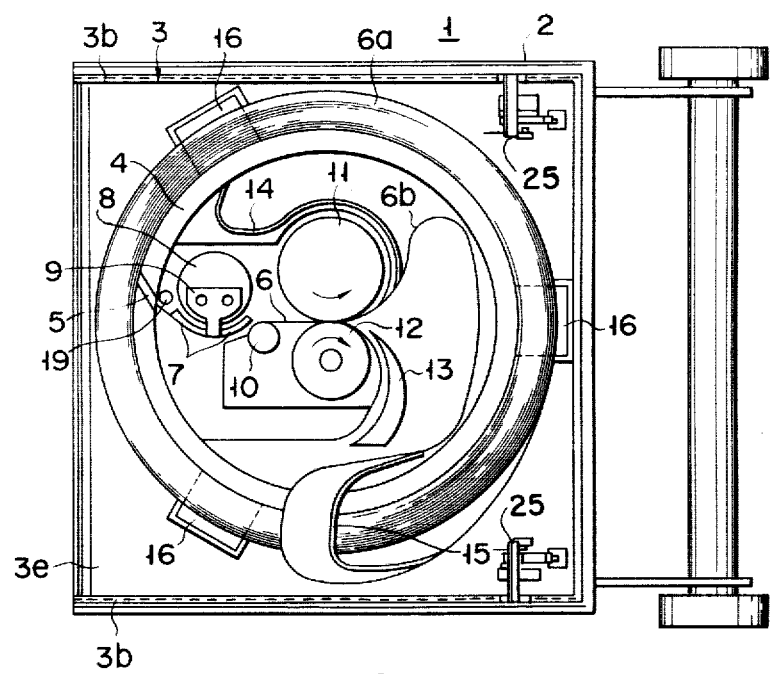
FIG. 1 is a plan view showing an embodiment of the endless tape cassette according to the invention in a loaded state in a tape drive system and being operated, with a top plate removed.

FIG. 1 is a plan view showing an endless cassette 1 loaded or in a cassette loading section or bucket in a tape driving system such as a stationary head VTR and brought to a state for driving the tape, with the top plate of a housing 3 of the cassette 1 and the top plate of a bucket 2 removed. As shown in detail in FIG. 3, the housing 3 has a front end plate 3a, a pair of side plates 3b and a top plate 3c which has a curved rear and thus serves also as a rear end section 3d. As shown in FIG. 1, a ring-like stationary reel 4 has its underside face in contact with and secured to the base or bottom plate 3e of the housing 3. The stationary reel 4 has a slit serving as a communication path 5 communicating its inner and outer peripheral sides. An endless magnetic tape 6 is wound as a tape roll 6a on the outer periphery of the reel 4, and it is led out from the inner periphery of the roll through the communicating path 5 into the space within the inner periphery of the reel 4. The tape 6 thus let out is guided by a pair of guides 7 to proceed in frictional contact with a recording and reproducing magnetic head 9 which is positioned between these guides 7 and mounted on a head feed mechanism 8, whereby recording or playback is made. Then, the tape 6 proceeds past a vertical position regulating guide 10 provided with upper and lower flanges and enters between a capstan 11 and a pinch roller 12, which drive the tape. The tape 6 having been fed out from between the capstan 11 and pinch roller 12 forms a sagging portion 6b in a space defined by guides 13 and 14 and then guided by a guide 15 to the outer side of the reel. The underside of the tape roll 6a wound on the reel 4 contacts with upper portions of three uniformly spaced rubber rollers 16, whereby the tape roll 6a is accurately held in the horizontal state.

Figure 2:
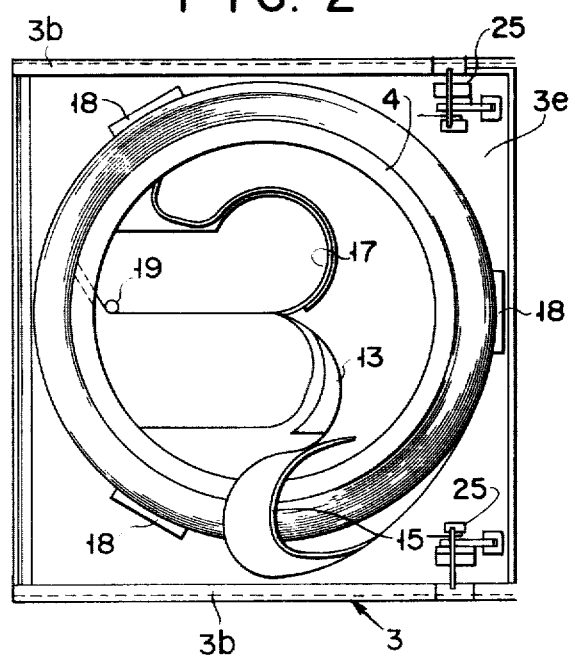
FIG. 2 is a plan view of the tape cassette with the top plate removed.

As clearly shown in FIG. 2, which shows the housing 3 of the cassette 1 with the top plate 3 removed, the bottom plate 3e of the cassette is formed at a portion within the inner periphery of the reel 4 with a first opening 17, through which a tape drive mechanism (including the pair guides 7, head feed mechanism 8, magnetic head 9, vertical position regulation guide 10, capstan 11 and pinch roller 12) can be projected into the housing 3. The bottom plate 3e is also formed at portions corresponding to the tape roll 6a with three second openings 18, through which the respective rubber rollers 16 can be projected into the housing 3. The aforementioned sagging part 6b of the tape is formed in a space on the bottom plate 3e defined by the guides 13 and 14 and reel 4. The guides 13 and 14 and also the guide 15 are secured to the housing 3. Designated at 19 in FIGS. 1 and 2 and FIGS. 6A and 6B is a pin which extends into the housing 3 and is swingably provided on the top plate 3c of the housing 3. When the pinch roller 12 is separated from the capstan 11 after the tape is stopped, the pin 19 is rotated to separate the tape 6 from the magnetic head 9 and capstan 11 for facilitating the operation of removing the cassette 1.

Figure 3:
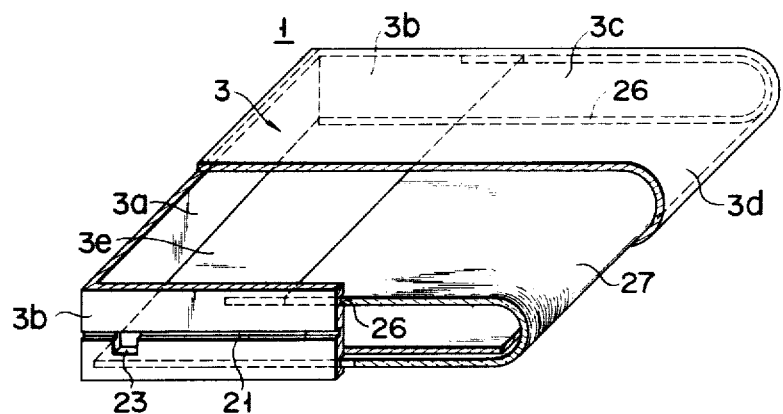
FIG. 3 is a perspective view, partly broken away, showing the housing of the endless tape cassette.
Figure 4:
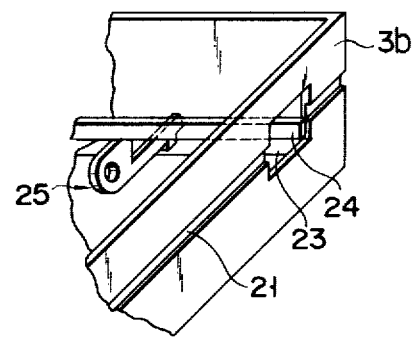
FIG. 4 is a fragmentary perspective view, partly broken away, showing the same endless tape cassette.

The housing 3 of the cassette 1 has a flat, substantially rectangular form as shown in FIG. 3, and may be inserted into the bucket at the front opening thereof by pushing it from its rear end 3d. The pair of side plates 3b of the housing 3 facing each other are respectively provided on their outer sides with substantially central longitudinal grooves 21 extending from the front end to the rear end of the housing. On the other hand, the side plates 2b of the bucket 2 shown in FIG. 5, in which the bucket is shown with the top plate removed, are provided with respective inner guide ridges 22 extending from the front end to the rear end of the bucket and adapted to be received in the corresponding guide grooves 21 for guiding the housing 3 as the housing is inserted into the bucket 2. Each plate 3b of the housing 3 is provided near its front end with an opening 23 aligned to the guide groove 21, and one end of an operating rod 24 of a lock mechanism 25 to be described later penetrates the opening 23 as shown in FIG. 4. Also, each side plate 3b is formed with a U-shaped inner groove 26 consisting of a lower portion extending under and along the bottom plate 3e, an intermediate curved portion extending along the inner side of the curved end portion 3d of the top plate 3c and an upper portion extending under and along part of the top plate 3c. A flexible lid member 27, for instance made of a synthetic resin, has its opposite side edges received in the respective guide grooves 26. The lid member 27 has a length slightly greater than the length of the lower portion of the U-shaped guide groove 26, and it is movable between a position at which it is found in the proximity of the underside of the bottom plate 3e so that the openings 17 and 18 are closed, and a position at which it is found in the proximity of the underside of the top plate 3c so that the openings 17 and 18 are open.

The lock mechanism 25 is provided in the housing 3 near the front plate 3a thereof as shown in FIG. 7A. The mechanism 25 includes a support 28 secured to the upper surface of the bottom plate 3e and a pivotal lever 29 supported for pivotal movement in the vertical directions by the support 28. The lever 29 is provided at its lower end with a lock pawl 29a which is normally received in a first engagement hole 30 formed in the bottom plate 3e and also in a second engagement hole 31 formed in the base 27 and adapted to be in register with the first engagement hole 30 when the lid member 27 is in the position of closing the openings 17, 18 of the housing 3, thus holding the lid member 27 in its position. The lever 29 is spring-biased for rotation in the counterclockwise direction by means of a wire spring 40 as shown in FIG. 7A. The aforementioned operating rod 24 is secured to the upper end of the lever 29, so that when the operating rod 24 is pushed from the front side the lever 29 is rotated against the spring force in the clockwise direction to release the lid member from the aforesaid closing position.

Figure 5:
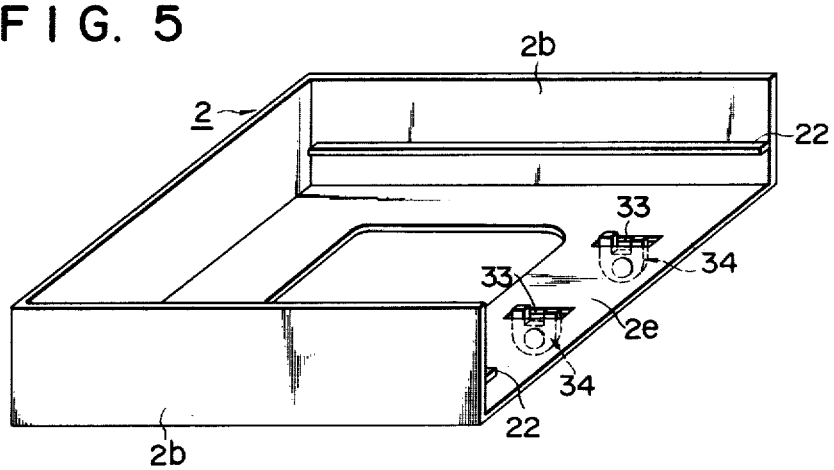
FIG. 5 is a perspective view showing a bucket of a tape driving device.

The underside of the front end of the lid member 27 is formed with an engagement ridge 32. The opposite ends of the engagement ridge 32 are slightly spaced from the corresponding side plates 3b so that the ridge will not obstruct the movement of the lid member 27 relative to the side plates 3b. As shown in FIG. 5, the bottom plate 2e of the bucket 2 is formed near its rear end with slits 33, through which ends of bifurcated or U-shaped lock arms 34 project. The lock arms 34 are pivotally mounted on the underside of the bottom plate 2e and biased for rotation in the direction of arrow A in FIG. 7A.

The operation of the endless tape cassette of the above construction will now be described.

Figure 6A:
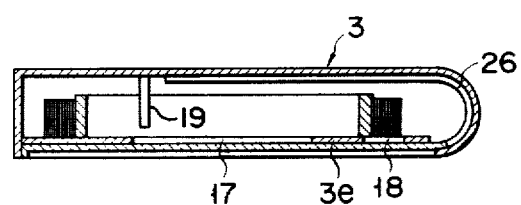
FIGS. 6A and 6B are sectional views showing the tape cassette in a state with the lid closed and in a state with the lid open respectively.
Figure 6B:
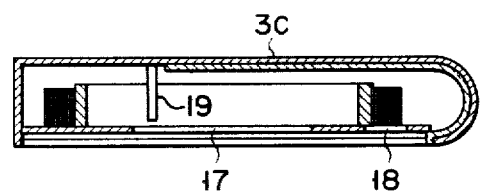

When the flexible lid member 27 is positioned on the side of the lower portions of the U-shaped guide grooves 26 so that the first and second openings 17 and 18 formed in the bottom plate 3e of the housing 3 are closed, the cassette is maintained in the protected state with the interior of the housing 3 protected from dust and other external influence. For rendering this cassette into the operative state, the housing is first held such that its front end 3a faces the rear end opening of the bucket 2 as shown in FIGS. 6A and 7A. Then, the housing 3 is inserted from the side of its front end plate 3a into the bucket 2 with the guide ridges 22 of the latter engaged in the guide grooves 21 in the former. When the housing 3 is slightly inserted so that the openings 23 formed in its side plates 3b reach the rear end of the ridges 22, the operating rod 24 projecting from the openings 23 is pushed by the ridges 22, whereby the pivotal lever 29 of the lock mechanism 25 is rotated in the clockwise direction against the force of the spring biasing it as shown in FIG. 7B. As a result, the lock pawl 29a of the pivotal lever 29 is detached from the engagement hole 31 of the lid member 27 to release the lock of the lid member 27 with respect to the housing 3. At this time, the engagement ridge 32 provided at the end of the lid member 27 is engaged by the ends of the bifurcated lock arms 34 of the bucket 2, whereby the lid member 27 is locked to the bucket 2. With the lid member 27 thus locked to the bucket 2, only the housing 3 is further inserted by further pushing the cassette. Consequently, the lid member 27 is moved relatively along the U-shaped guide grooves 26 of the housing 3 toward the top plate 3c of the housing 3, ultimately it assumes a position at which the first and second openings 17, 18 are no longer closed as shown in FIGS. 6B and 7C. In this state, the cassette is loaded together with the bucket in the tape drive system from above, whereby the necessary mechanism of the tape drive system projects through the openings 17 and 18 into the housing 3 to be ready for driving the tape within the housing 3.

While in the above embodiment the tape cassette is operatively coupled to the tape drive mechanism by using a bucket, into which the cassette is inserted at the open end and loaded in it, the invention may also be applied to a cassette which is loaded without using such a support mechanism, for instance a cassette which is loaded sidewise. Also, while in the above description the top plate, bottom plate, front and rear end plates and side plates are used as parts constituting the walls of the cassette, they are referred to as such for the sake of discriminating them from one another with no sense of specifying their orientation or position. For example, in case where the tape drive system is of lateral type, that is, in case where the tape drive mechanism projects sidewise, the bottom plate of the housing actually constitutes the side wall thereof.

Further, while in the above embodiment the rear end of the cassette housing has a rearwardly convex curved sectional profile, this convex shape is by no means limitative, and also the rear end may not rearwardly project. Even in such case, however, the guide grooves desirably have a substantially U-shaped form. Further, the guide paths themselves need not be in the form of the grooves formed in the side plates, and it is possible as well to provide the side plates with ribs extending along and slightly spaced apart from the top and bottom plates and guide the opposite side edges of the lid member by the channels defined by these ribs and the top and bottom plates. In this case, the ribs may not be continuous.

Furthermore, it is possible to dispense with some of the above-mentioned component parts, for instance the lock mechanism for locking the lid member in the closing position, at which the lid member extends along the bottom plate of the housing, the releasing mechanism for releasing the lock mechanism from the lock stae and the lock mechanism 34 for locking the lid member to the support mechanism (i.e., bucket) of the tape drive system in the initial stage of insertion of the cassette. Even if these parts are not omitted, their constructions in the above embodiment are not limitative, and any alternative constructions may be used so long as they have their respective proper functions.

We claim:

1. An endless tape cassette to be loaded for driving an endless tape accommodated therein on a tape drive system having a tape drive mechanism and a tape support mechanism for supporting said endless tape cassette such that the tape is driven by the tape drive mechanism, comprising:

a stationary reel having a communicating path communicating inner and outer peripheral sides thereof and carrying the endless tape wound on the outer peripheral side;

guide means for guiding the endless tape wound on said stationary reel such that it is pulled out from the inner peripheral side of the wound tape through said communicating path and taken up on the outer peripheral side of said wound tape;

a housing accommodating and supporting said stationary reel and said guide means, wherein the housing comprises:

a bottom plate formed with an opening for permitting said tape drive mechanism to be inserted therethrough into said housing at a position on said inner peripheral side of said wound tape for operatively coupling to said endless tape, a top plate facing said bottom plate, a pair of side plates, a front end plate and a rear end plate, a lid member comprising a flexible plate provided on said housing to be movable between a first position at which said flexible plate extends along said bottom plate for closing said opening in said bottom plate and a second position at which said flexible plate extends along said top plate for opening said opening in said bottom plate; and means for moving said flexible plate from said first position to said second position in cooperation with the support mechanism when said housing is supported by said support mechanism, wherein said moving means comprises:

a first engaging member located on a tip edge portion of said flexible plate, and a second engaging member pivotally mounted on a front edge portion of said support mechanism to engage said first engaging member when said housing is initally inserted into said support mechanism and to allow forward movement of said housing within said support mechanism and relative movement of said flexible plate toward said second position upon further insertion of said housing into said support mechanism.

2. An endless tape cassette according to claim 1, wherein said rear end plate of said housing has a rearwardly convex curved sectional profile, and wherein said side plates have respectively U-shaped guide members extending along the underside of said bottom plate, the inner side of said rear end plate and the underside of said top plate, movement of said flexible plate being achieved with a leading end portion of said flexible plate guided by said guide members.

3. An endless tape cassette according to claim 2, wherein said guide members comprise grooves formed on the inner side of said side plates.

4. An endless tape cassette according to claim 2, wherein said housing comprises a flat casing for insertion from a front end plate side thereof into said support mechanism.

5. An endless tape cassette according to claim 4, further comprising a first lock mechanism for holding said flexible plate in said first position.

6. An endless tape cassette according to claim 5, wherein said first lock mechanism comprises said bottom plate having an opening formed therein, said flexible plate having an opening formed therein and in register with said opening formed in said bottom plate when said flexible plate is in said first position, a locking lever pivotally mounted on said bottom plate and biasing means for pivotally biasing said lever in one direction such that a portion of said lever is received in said opening in said flexible plate through said opening in said bottom plate to lock said flexible plate to said bottom plate when said flexible plate is in said first position.

7. An endless tape cassette according to claim 5, further comprising a releasing mechanism for releasing said first lock mechanism upon initial insertion of said housing into said support mechanism and a second lock mechanism for locking said flexible plate to said second engaging member simultaneously with releasing of said first lock mechanism.

8. An endless tape cassette according to claim 7, wherein said second lock mechanism comprises said first engaging member.

9. An endless tape cassette according to claim 1, wherein said first engaging member comprises a ridge member formed on said tip edge portion of said flexible plate.

10. An endless tape cassette according to claim 1 or 9, wherein said second engaging member comprises a U-shaped member having first and second lock arms.

11. An endless tape cassette according to claim 1, further including means for rotatably biasing said second engaging member in one direction.

* * * * *